United States Patent [19]

Van Tetering et al.

[11] Patent Number: 5,563,877
[45] Date of Patent: Oct. 8, 1996

[54] TELECOMMUNICATION NETWORK NODE

[75] Inventors: Johannes A. M. Van Tetering, Zevenbergen, Netherlands; Marc R. A. G. Delvaux, Antwerpen, Belgium

[73] Assignee: Alcatel N.V., Rijswijk, Netherlands

[21] Appl. No.: 309,406

[22] Filed: Sep. 20, 1994

[30] Foreign Application Priority Data

Sep. 20, 1993 [EP] European Pat. Off. .............. 93202721

[51] Int. Cl.$^6$ ...................................................... H04J 3/07
[52] U.S. Cl. ......................... 370/58.2; 370/60.1; 370/61; 370/102; 370/108
[58] Field of Search ................................ 370/58.1, 58.2, 370/60, 60.1, 61, 94.1, 94.2, 102, 100.1, 106, 105.1, 105.2, 105.4, 108

[56] References Cited

U.S. PATENT DOCUMENTS

| | | | |
|---|---|---|---|
| 4,894,823 | 1/1990 | Adelmann et al. | 370/60 |
| 5,007,070 | 4/1991 | Chao et al. | 375/118 |
| 5,127,000 | 6/1992 | Henrion | 370/60 |
| 5,172,376 | 12/1992 | Chopping et al. | 370/100.1 |
| 5,173,897 | 12/1992 | Schrodi et al. | 370/60 |
| 5,207,351 | 5/1993 | De Prycker et al. | 370/94.1 |
| 5,359,600 | 10/1994 | Ueda et al. | 370/60.1 |
| 5,414,705 | 5/1995 | Therasse et al. | 370/60.1 |

FOREIGN PATENT DOCUMENTS 8807297 9/1988 WIPO .............. H04L 11/20

OTHER PUBLICATIONS

Section 7.3.1 "Adaptation between Section and HO Path Layers" by M. Sexton et al; *Transmmission networking: SONET and the Synchronous Digital Hierarchy*, Artech House, 1992.

"Technology, Distributed Control and Performance of a Multipath Self–Routing Switch" by M. A. Henrion et al ISS, Oct. 1992, vol. 2, pp. 2–6.

*Primary Examiner*—Douglas W. Olms
*Assistant Examiner*—Russell W. Blum
*Attorney, Agent, or Firm*—Ware, Fressola, Van Der Sluys & Adolphson

[57] ABSTRACT

A telecommunication network node is proposed which provides a novel solution to the realignment of payload of an input datastream (IN) within an output datastream (OUT) after dismantling the former. The present network node thereto generates from the payload of the input datastream (IN) data units (MSCI) some of which include a time label (TL) indicative of the moment at which they are derived. These data units (MSCI) are stored in a buffer (BM) from which they are read at a varying rate determined to track the input data rate and constituting the output data rate. This tracking is achieved by using the time labels to calculate a node delay, i.e. the delay between the derivation and the reading of a data unit, and by changing the above rate as a function of this node delay in order to keep it within predetermined bounds. A particular embodiment of the present network node allows to cross-connect Synchronous Digital Hierarchy (SDH) or Synchrnous optical Network (SONET) datastreams using an Asynchronous Transfer Mode or ATM switch (MPSR).

8 Claims, 1 Drawing Sheet

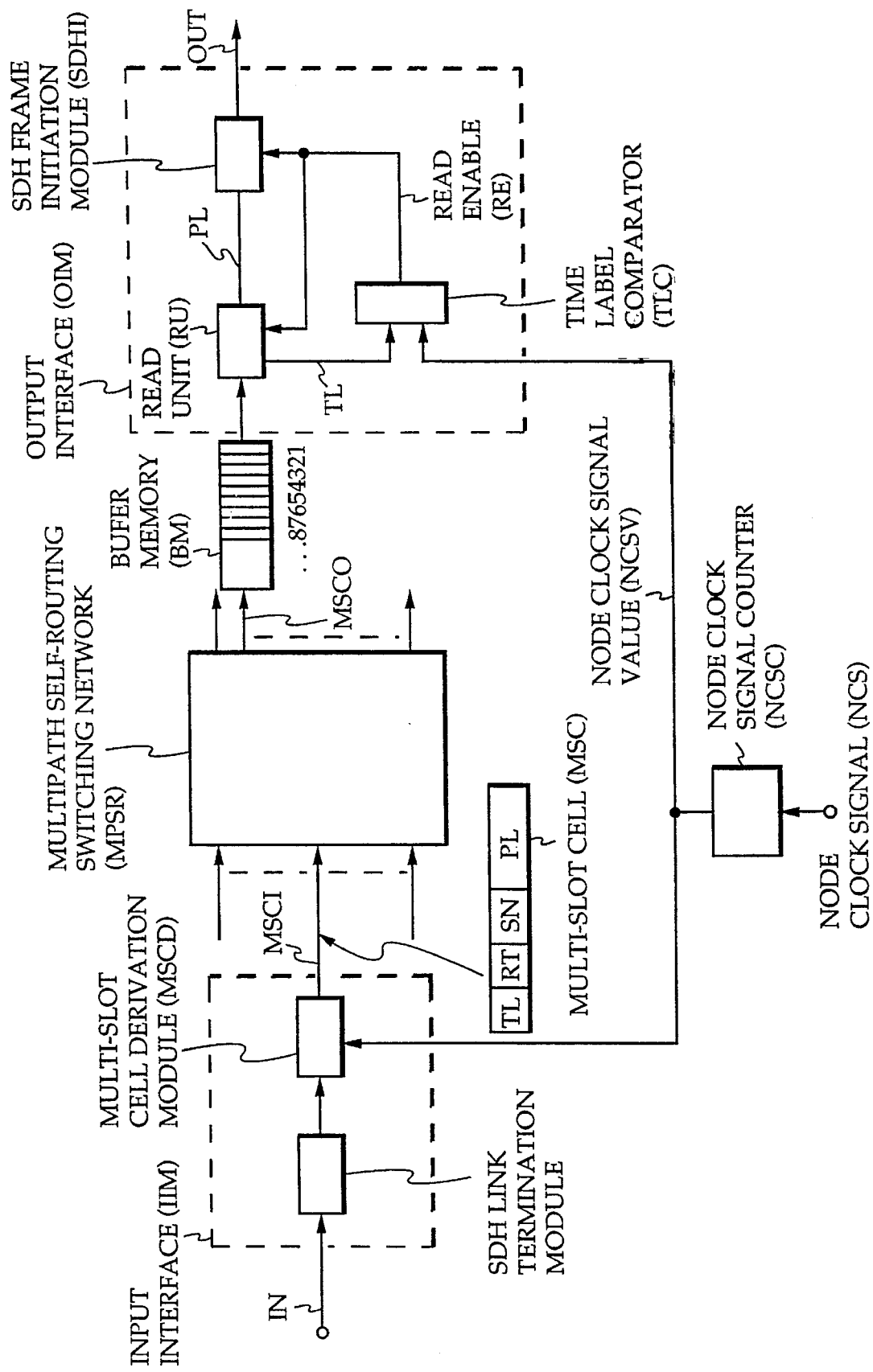

TELECOMMUNICATION NETWORK NODE

TECHNICAL FIELD

The present invention concerns a telecommunication network node including an input interface for generating successive data units from an input datastream synchronous with a receive clock signal, a buffer for storing the data units and an output interface for reading the data units from the buffer means thereby producing at least one output datastream synchronous with a transmit clock signal.

BACKGROUND OF THE INVENTION

Such a telecommunication network node is already known in the art, for instance from the book "Transmission networking: SONET and the Synchronous Digital Hierarchy" by M. Sexton et al., Artech House, 1992 and more particularly from section 7.3.1 "Adaptation between Section and HO Path Layers" thereof. The known node, depicted in detail in FIGS. 7.26 and 7.27, handles input and output datastreams according to the Synchronous Digital Hierarchy SDH.

The node discussed in the above section is chosen so as to highlight a basic requirement for a network node of the above type, namely the fact that after dismantling of the input datastream its payload, represented by the successive data units, needs to be realigned in an output frame format synchronous with the transmit clock signal.

In the above known node this requirement is met by allowing the buffer means to absorb the effects of pointer justifications in the input datastream and of differences in phase and/or frequency between the transmit and receive clock signals. By reading out the buffer means at a rate varying as a consequence of the above effects these may be accounted for in the output datastream through pointer justifications. The known network node determines the required varying rate as a function of the buffer means filling level represented by the difference between the values of read and write pointers to this buffer. The output interface thus checks at every pointer justification opportunity if the buffer filling level is too high or too low and if so temporarily increases or decreases the rate at which it reads the buffer means in order to make a positive or negative pointer justification respectively.

A drawback of this known network node is that the filling level of the buffer means is not always a good measure of the effects which are to be translated in the above-mentioned varying rate. Indeed, if the successive data units experience a variable delay before being written in the buffer means, the latter variable delay accounts for most of the fluctuations in the buffer filling level and hence gives rise to undesired pointer justifications independent of the above mentioned effects. Also, if this variable delay is such that the successive data units do not arrive in sequence at the buffer means, it is not only hard to compute the filling level of the buffer means but it is also unrealistic to use such a filling level to determine the varying rate.

DISCLOSURE OF INVENTION

An object of the present invention therefore is to provide a telecommunication network node of the above type but which uses a more appropriate measure for determining the rate at which the buffer is read.

This object is achieved thanks to the fact that the input interface associates to each set of data units a time label indicative of the actual value of a node clock signal at the time the data units are generated while the output interface includes a comparator for determining for each set a node delay based on the time label and node clock signal and read means for reading the data units at a rate such that the thus measured delays remain within predetermined bounds.

Through the above use of time labels the effects of pointer justifications in the input datastream and of clock signal differences are automatically taken into account by the output interface. Indeed, the above effects amount to variations in the payload data rate of the input datastream and thus lead to increases/decreases in the node delays for a specific read-out rate of the buffer means, the latter rate determining the payload data rate in the output datastream. It can thus be seen that in the above way the payload data rate of the output datastream tracks that of the input datastream which is just what is required for the present network node.

It can be appreciated that in so doing a generic solution is arrived at which remains unaffected by variable processing delays in the node since the lower bound for the node delay obviously has to be larger than the maximum delay prior to the buffer means for any network node of the above type. Thus the exact value of this variable processing delay is integrated out in using the time labels in the above way as it is in any case assured that a data unit is available in the buffer means when the output interface means attempts to read it. Through the use of node delays it is unimportant how the constituent parts of this delay are distributed over the distinct parts of the node, the processing part prior to the buffer means or the buffer means itself, as it should be.

A characteristic feature of the present invention is that the read means increases said rate if said measured node delay is higher than an upper threshold value and decreases the rate if said measured node delay is lower than a lower threshold value, and that a first the data unit is read when its node delay is comprised between the upper and lower threshold values.

An important feature of the present invention is that the rate is fixed relative to said transmit clock signal, the increase/decrease of said rate corresponding to an increase/decrease in the frequency of the transmit clock signal, the output datastream being a plesiochronous digital hierarchy datastream.

Although up to now the network node is discussed using SDH terminology, similar network nodes are also needed in Plesiochronous Digital Hierarchy PDH environments wherein bit stuffing is analogous to pointer justification. However, in accordance with the above feature the more complicated mechanism of bit stuffing may be subdued with regard to the output datastream in using a characteristic inherent to PDH namely that the frequencies with which the output datastream is synchronous may vary over a relatively large range with respect to SDH. It may thus be possible to derive the output datastream without having to use the bit stuffing mechanism if, as described above, the transmit clock signal is directly determined by the node delays.

If the above way of deriving the above feature is not allowed, e.g. due to design tolerances, the invention may alternatively be characterized in that the transmit clock signal is equal to the node clock signal, said rate having a nominal value relative to the transmit clock signal in the absence of an increase/decrease, such an increase/decrease being accommodated by bit stuffing, and the output datastream being a plesiochronous digital hierarchy datastream.

Further characteristic features of the present invention are that the node further includes a processing means coupled between the input interface and the buffer, and that the processing means submits the data units to a variable processing delay.

Telecommunication network nodes obviously have to perform other functions related to the processing of the data units apart from the reconstruction of an output datastream, these functions being performed by the processing means. It is this processing means which may give rise to the variable processing delays incompatible with the known node.

These variable processing delays occur for instance if the node is to perform cross-connecting and/or switching of SDH and PDH datastreams and if the latter is achieved by an asynchronous transfer mode or ATM switching network such as for instance described in the article "Application of the multipath self-routing switch in a combined STM/ATM cross-connect system", by B. Pauwels et al., ISS, October 1992, Yokohama, Vol. 1, pp. 324–328. In the latter article it is argued that the above function is of particular importance within the context of present day telecommunications as in this way all types of datastreams may be switched through a same type of switch and as the latter facilitates the early deployment of these ATM switches and hence also the universal application of the broadband ISDN network.

An extremely important feature of the invention is therefore that the processing means is an asynchronous transfer mode multi-path switching network, and that the input interface associates a sequence number to each of the successive data units, the data units being stored in the buffer in a location reserved for the sequence number associated thereto.

It can be easily verified that in the above way the 'synchronous' SDH and PDH datastreams may be handled by the asynchronous switching network in a simple way thereby eliminating an obstacle toward the universal use thereof.

These and other objects, features and advantages of the present invention will become more apparent in light of the detailed description of a best mode embodiment thereof, as illustrated in the accompanying drawing.

BRIEF DESCRIPTION OF THE DRAWING

The sole figure shows an telecommunication network node in accordance witch the present invention.

BEST MODE FOR CARRYING OUT THE INVENTION

The node of the figure is adapted to crossconnect a plurality of Synchronous Digital Hierarchy or SDH datastreams. From these datastreams only an input datastream IN and a corresponding output datastream OUT are shown, both datastreams comprising frames of the STM-1 type as specified in the SDH-standards. From the following description it is obvious to a person of ordinary skill in the art how other datastreams like IN and OUT may be handled by the network node.

This network node includes an input interface IIM to which the input datastream IN is supplied and which, in a manner to be later described, derives therefrom a plurality of successive multi-slot cells MSCI of the type depicted in an inset of the drawing and indicated with reference MSC. These cells MSCI are applied to a like named input port of a multipath self-routing switching network MPSR adapted to switch Asynchronous Transfer Mode or ATM traffic as described in more detail in the above article by B. Pauwels. MPSR more particularly switches cells MSCI to its output port MSCO from where they are written into a buffer BM. Finally, the thus stored cells are read from BM by an output interface OIM which thereby produces the output datastream OUT.

The telecommunication network node further includes a node clock signal counter NCSC which counts clock pulses of a node clock signal NCS and thereby produces a node clock signal value NSCV which is used as a time reference within the node as explained hereinbelow. With the latter purpose the node clock signal value NCSV is forwarded to the input and output interfaces, IIM and OIM respectively. It is to be noted that the node clock signal NCS is further also used to control the operation of the other elements of the network node in a not shown manner.

The building blocks of the network node as well as their operation are discussed in detail hereafter. However, it has to be borne in mind that a considerable part thereof is already known in the art from one of the above references, i.e. from the book by M. Sexton and the article by B. Pauwels in which the use of the switching network MPSR as an SDH cross-connect is already described. Throughout the following the known aspects of the interfaces IIM and OIM and the switch MPSR are hence only briefly mentioned whereas novel features of the network node are highlighted, the mentioned documents being therefore incorporated herein by reference.

The input interface IIM includes as a first element an SDH link termination module SDHT extracting, e.g., the payload of an SDH VC-4 type virtual container (or SONET STS-3C) from the input datastream IN. SDHT forwards this payload to a second element of the input interface IIM, namely a multi-slot cell derivation module MSCD which arranges the payload in a plurality of successive multi-slot cells MSC. As depicted in an inset MSC of the drawing each of these multi-slot cells MSC contains a time label TL to be considered later, a self-routing tag RT, a sequence number SN and a respective part PL of the payload. According to the article by B. Pauwels the self-routing tag RT indicates to the switch MPSR that the multi-slot cell MSC from which it is a part should be switched to the output port MSCO, while the sequence number SN indicates the relative position of the payload PL of the multi-slot cell MSC within its VC-4 type container, this enabling the reconstruction of the correct sequence of cells MSC at the output of MPSR.

The insertion of the time label TL in the cell MSC is the only novel feature of MSCD which needs to be further discussed with respect to MSCD. This time label TL is derived from the above mentioned node clock signal value NSCV and is more particularly equal to the value of NCSV at the moment an above payload part PL is inserted in the multi-slot cell MSC.

By operating in the above way, MSCD generates a stream of multi-slot cells MSCI comprising successive multi-slot cells derived from successive SDH virtual containers VC-4 (or SONET STS-3C) of the input datastream IN. As already mentioned, this stream MSCI is forwarded to the like named input port MSCI of the switching network MPSR. Under the control of the self-routing tags RT of these cells MSCI, MPSR switches this cell stream MSCI to the output port MSCO. As explained in the article by B. Pauwels these cells may experience a variable delay in the switching network MPSR as they may travel from MSCI to MSCO via a plurality of paths and may therefore also arrive at the output port MSCO in a sequence different from that in which they were applied to MSCI.

The stream of multi-slot cells appearing on MSCO is first passed through a time-out circuit (not shown) included in the buffer BM and which is together with the reasons for its inclusion discussed in the article by B. Pauwels. This time-out circuit checks wether the delay experienced by each of the multi-slot cells MSC in the switching network MPSR is not larger than a predetermined delay so chosen that the corresponding cell loss probability due to the time-out circuit is sufficiently small to guarantee a specific quality of service.

The majority of the cells obviously pass through the time-out circuit and are stored in the buffer BM. This buffer BM is constituted by a conventional RAM each memory location $0, \ldots, 8, \ldots$ of which is reserved for a cell MSC characterized by a particular sequence number SN. By writing the cells MSC in the buffer BM at their reserved locations their original sequence, i.e. the sequence in which they are applied on MSCI, is automatically restored. The buffer BM is so dimensioned as to accommodate as many sequence numbers as correspond to the predetermined delay and the the time-out circuit thus prevents a cell from being stored in a location reserved for a later cell.

The output interface OIM includes a read unit RU which reads the multi-slot cells MSC from BM and provides at a first output the payload part PL of the cell MSC and at a second output the time label TL of this cell. Via the former first output the payload part PL is supplied to an SDH frame initiation module SDHI. The latter sends this payload part PL within an SDH virtual container VC-4 (or SONET STS-3C) in an appropriate position within the output datastream OUT. On the other hand, via the latter second output of the read unit RU the time label TL is applied to an input of a time label comparator TLC to another input of which the node clock signal value NCSV is applied.

The comparator TLC calculates for each cell a node delay-equal to the delay experienced by this cell between the moment its time label TL was inserted therein and the moment it is supplied to the comparator TLC by subtracting this time label TL from the actual node clock signal value NSCV. TLC further converts the result to a 2 bit read enable signal RE. The latter conversion more particularly consists in setting the first/second of these bits RE if the computed node delay is higher/lower than an upper/lower threshold at the moment a positive/negative pointer justification is authorized in the output datastream OUT. It is to be noted that apart from the above normal conversion operation TLC also sets both bits RE during initialization, i.e. before the first cell is read from the buffer BM and forwarded to SDHI, and that the latter condition for RE persists until the time label TL of the first cell MSC of the input datastream IN is larger than the lower threshold upon which occasion TLC resets both bits RE thus authorizing the start of the transmission of the output datastream OUT as described later.

Since TLC thus knows at which moment transmission is started and also counts the number of cells forwarded to SDHI, it can determine when a new VC-4 container or STS-3C synchronous payload envelope of the output datastream OUT is filled and it hence knows at which moments pointer justification is allowed. It is to be noted in this respect that it is not strictly needed to insert a time label TL in each multi-slot cell MSC since it follows from the above that the time label comparator TLC may only authorize pointer justifications at distinct points in time between which a plurality of cells MSC are handled by the output interface OIM. It is thus sufficient to insert a time label TL only to cells MSC interspaced with a number of cells corresponding to the time difference between distinct pointer justification authorizations. In fact the number of cells MSC in which a time label TL is inserted may be even lower if the effect thereof on the control loop constituted by RU and TLC does not give rise to unsatisfactory behaviour.

In the following the reconstruction of the output datastream OUT is explained in more detail with regard to the above architecture of the output interface OIM.

When controlled by two bits RE in the set condition the read unit RU reads the first of the successive cells MSC from the buffer BM and forwards the time label TL thereof to TLC which carries out the above discussed comparison. As also already mentioned, this process is continued without starting the transmission of the output datastream OUT until the thus measured node delay is larger than a lower threshold at which moment TLC resets both bits of RE. In this way it is ensured that sufficient time has elapsed for the first cells derived from the input datastream IN to be buffered in BM, this time being larger than the above mentioned predetermined delay.

Upon the resetting of the bits RE the read unit RU forwards the first cell MSC to SDHI which can thus start with the transmission of the output datastream OUT according to known principles. The read unit RU then continues reading cells from the buffer BM in the sequence determined by their sequence numbers (and hence it reads the buffer BM in a fixed sequence as each sequence number is allocated a fixed memory location) and at a nominal rate which is equal to the payload data rate of the output datastream consisting of STM-1 (or SONET STS-3C) frames as already mentioned. As described above, each time an SDH virtual container VC-4 (or SONET STS-3C) of one such an STM-1 (or SONET STS-3C) frame is filled TLC knows that pointer justification is allowed and can set one of the bits RE dependent upon the last measured node delay. If the first/second of these bits RE is thus set the read unit RU temporarily speeds up/slows down the rate at which it reads the buffer BM in order to cater for the increase/decrease in payload data rate required by SDHI to make a corresponding positive/negative pointer justification.

With the above operation it is ensured that the node delay remains within predetermined bounds from which the above upper and lower thresholds may be determined. The lower bound thus established has to be larger than the mentioned predetermined delay in order to be always sure, i.e. with the probability determined by the required quality of service, that when the read unit attempts to read a particular cell, this cell is already available in the buffer. The upper bound must be chosen to provide for a sufficient threshold spacing which is discussed in some detail in the book by M. Sexton, it furthermore determines the worst case over-all delay as well as the buffer size and is therefore chosen as small as possible in view of the above restrictions resulting from a minimal buffer threshold spacing.

It is to be noted that the above described network node may be used to switch simultaneously a plurality of ATM and PDH datastreams applied to input ports other than MSCI and destined for output ports other than MSCO. In this case other than the above described input and output interfaces, IIM and OIM respectively, need to be provided. However, in the light of the above description the structure of such interfaces may be derived by a person of ordinary skill in the art. The same holds for the design of a node in which input datastreams IN consisting of STM-4 frames have to be disinterleaved and in which each of the separate VC-4's may be switched to separate output ports of the switching network and possibly assembled in output datastreams of the STM-4 format together with VC-4's from other input datastreams.

While the principles of the invention have been described above in connection with specific apparatus, it is to be clearly understood that this description is made only by way of example and not as a limitation on the scope of the invention.

Similarly, although the invention has been shown and described with respect to a best mode embodiment thereof, it should be understood by those skilled in the art that the foregoing and various other changes, omissions and additions in the form and detail thereof may be made therein without departing from the spirit and scope of the invention.

The invention claimed is:

1. Telecommunication network node including input interface means (IIM) for providing successive multi-slot cells (MSC) from at least one input datastream (IN) synchronous with a receive clock signal, buffer means (BM) for storing said multi-slot cells and output interface means (OIM) for reading said multi-slot cells from said buffer means for providing at least one output datastream (OUT) synchronous with a transmit clock signal, wherein said input interface means (IIM) associates to at least a selected one of said multi-slot cells (MSC) a time label (TL) indicative of an actual value (NCSV) of a node clock signal (NCS) at a time said at least a selected one of said multi-slot cells is provided while said output interface means (OIM) includes comparison means (TLC) for determining for said at least a selected one of said multi-slot cells a node delay based on said time label and said node clock signal and read means (RU) for said reading of said multi-slot cells from said buffer at a controllable rate such that said node delay remains within predetermined bounds.

2. Telecommunication network node according to claim 1, wherein said read means (RU) increases said controllable rate if said measured node delay is higher than an upper threshold value and decreases said controllable rate if said measured node delay is lower than a lower threshold value, and wherein a first multi-slot cell (MSC) is read when its node delay is between said upper and lower threshold values.

3. Telecommunication network node according to claim 2, wherein said controllable rate is fixed relative to said transmit clock signal, said increase/decrease of said controllable rate corresponding to an increase/decrease in a frequency of said transmit clock signal, said output datastream (OUT) being a plesiochronous digital hierarchy datastream.

4. Telecommunication network node according to claim 2, wherein said transmit clock signal is equal to said node clock signal (NCS), said controllable rate having a nominal value relative to said transmit clock signal in the absence of a said increase/decrease, a said increase/decrease being accommodated by bit stuffing, and said output datastream (OUT) being a plesiochronous digital hierarchy datastream.

5. Telecommunication network node according to claim 2, wherein said transmit clock signal is equal to said node clock signal (NCS), said controllable rate having a nominal value relative to said transmit clock signal in the absence of a said increase/decrease, a said increase/decrease being accommodated by pointer justifications, and that said output datastream (OUT) is a synchronous digital hierarchy datastream.

6. Telecommunication network node including input interface means (IIM) for providing successive multi-slot cells (MSC) from at least one input datastream (IN) synchronous with a receive clock signal, buffer means (BM) for storing said multi-slot cells and output interface means (OIM) for reading said multi-slot cells from said buffer means for providing at least one output datastream (OUT) synchronous with a transmit clock signal, wherein said input interface means (IIM) associates to at least a selected one of said multi-slot cells (MSC) a time label (TL) indicative of an actual value (NCSV) of a node clock signal (NCS) at a time said at least a selected one of said multi-slot cells is provided while said output interface means (OIM) includes comparison means (TLC) for determining for said at least a selected one of said multi-slot cells a node delay based on said time label and said node clock signal and includes read means (RU) for said reading of said multi-slot cells at a controllable rate such that said node delay remains within predetermined bounds, wherein said node further includes a processing means (MPSR) coupled between said input interface means (IIM) and said buffer means (BM).

7. Telecommunication network node according to claim 6, wherein said processing means (MPSR) submits said multi-slot cells (MSC) to a variable processing delay.

8. Telecommunication network node according to claim 7, wherein said processing means is an asynchronous transfer mode multi-path switching network (MPSR), and that said input interface means (IIM) associates a sequence number (SN) to at least a selected one of said successive multi-slot cells (MSC), said multi-slot cells being stored in said buffer means (BM) in a location (1, 2, . . . , 8, . . . ) reserved for a said sequence number associated thereto.

* * * * *

UNITED STATES PATENT AND TRADEMARK OFFICE
CERTIFICATE OF CORRECTION

PATENT NO. : 5,563,877
DATED     : October 8, 1996
INVENTOR(S): Van Tetering et al It is certified that error appears in the above-indentified patent and that said Letters Patent is hereby corrected as shown below:

Abstract, item [57], line 18, please cancel "Synchrnous optical" and substitute --Synchronous Optical-- therefor.

Signed and Sealed this

Twenty-fifth Day of February, 1997

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,563,877
DATED : October 8, 1996
INVENTOR(S) : Van Tetering et al

It is certified that error appears in the above-indentified patent and that said Letters Patent is hereby corrected as shown below:

On the title page:
At INID [56], line 8, please cancel "5,207,351  5/1993" and substitute --5,027,351  6/1991-- therefor; and Signed and Sealed this Eighth Day of April, 1997

Attest:

BRUCE LEHMAN

*Attesting Officer*        *Commissioner of Patents and Trademarks*